(12) United States Patent
Hu

(10) Patent No.: US 7,702,170 B2
(45) Date of Patent: Apr. 20, 2010

(54) METHOD OF BLOCK CODING OF IMAGE

(75) Inventor: Po-Chin Hu, Taoyuan County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 902 days.

(21) Appl. No.: 11/469,481

(22) Filed: Aug. 31, 2006

(65) Prior Publication Data

US 2008/0013844 A1    Jan. 17, 2008

(30) Foreign Application Priority Data

Jul. 12, 2006    (TW) ............................... 95125473 A

(51) Int. Cl.
  *G06K 9/36* (2006.01)
  *G06K 9/46* (2006.01)
(52) U.S. Cl. ................... 382/240; 382/232; 382/234
(58) Field of Classification Search .............. 382/232, 382/234, 240
  See application file for complete search history.

(56) References Cited

U.S. PATENT DOCUMENTS

| 6,163,626 A | 12/2000 | Andrew |
| 7,346,640 B2 * | 3/2008 | Katayama ................ 708/402 |
| 2005/0012645 A1 | 1/2005 | Funakubo |
| 2006/0188012 A1 * | 8/2006 | Kondo ................... 375/240.2 |
| 2008/0008395 A1 * | 1/2008 | Liu ........................ 382/244 |

FOREIGN PATENT DOCUMENTS

| WO | 9916249 | 4/1999 |
| WO | 03058973 A2 | 7/2003 |

OTHER PUBLICATIONS

Acharya, T. et al. "A Survey on Lifting-based Discrete Wavelet Transform Architectures", J. VLSI Signal Processing. 42, 321-339 (2006).*

* cited by examiner

*Primary Examiner*—Samir A. Anwar
(74) *Attorney, Agent, or Firm*—Winston Hsu

(57) ABSTRACT

A method of block encoding of an image includes partitioning an image into a plurality of blocks each having a plurality of pixels corresponding to a first matrix, obtaining a first block from the plurality of blocks, rearranging pixels of the first block for generating a second block according to an arrangement rule, performing wavelet transformation for the second block for generating a third block having a plurality of wavelet coefficients corresponding to the first matrix, rearranging the wavelet coefficients of the third block for generating a fourth block according to the arrangement rule, quantizing the fourth block, and encoding a quantized result of the fourth block.

27 Claims, 10 Drawing Sheets

|        |        |        |        |
|--------|--------|--------|--------|
| P(0,0) | P(0,1) | P(0,2) | P(0,3) |
| P(1,0) | P(1,1) | P(1,2) | P(1,3) |
| P(2,0) | P(2,1) | P(2,2) | P(2,3) |
| P(3,0) | P(3,1) | P(3,2) | P(3,3) |

| a+c | a-c | b+d | b-d |
|-----|-----|-----|-----|
| i+k | i-k | j+l | j-l |
| e+g | e-g | f+h | f-h |
| m+o | m-o | n+p | n-p |

| 4 | 4 | 4 | 3 |
|---|---|---|---|
| 4 | 4 | 4 | 4 |
| 3 | 3 | 4 | 4 |
| 7 | 3 | 4 | 4 |

Fig. 8

| 8 | 3 | 4 | 4 |
|---|---|---|---|
| 3 | 3 | 4 | 3 |
| 4 | 4 | 4 | 4 |
| 4 | 3 | 4 | 4 |

METHOD OF BLOCK CODING OF IMAGE

BACKGROUND OF THE INVENTION

1. Field of the Invention

The present invention is related to provide a method of block coding of an image, and specifically, a method of block encoding and decoding for applications requiring fixed length coding or parallel computation, so as to avoid complicated encoding and huge codebooks.

2. Description of the Prior Art

With rapid development of communications and computer technology, image applications are used in a diverse range. Most image applications, including video conferencing, video phoning over mobile phones or a public switched telephone network (PSTN), digital video broadcasting (DVB), etc., require high-efficiency data compression for transforming plenty of image information into packets suitable for being transmitted through narrowband channels with desirable image quality.

Image compression techniques are classified into two levels. Firstly, for video data such as continuous animation and movie clips, displaying a series of images or pictures on time domain creates motion of an object. Therefore, lower data quantity can be achieved by reducing redundancy on the time domain as well as image parts same as or similar to former image parts are not to be transmitted or to be transmitted in fewer bits. Secondly, for an image or a picture, if a pixel is same as or similar to an adjacent pixel, the pixel (or the adjacent pixel) is not to be transmitted or be transmitted in fewer bits. In other words, image compression techniques transmit redundant data of image or video contents with fewer bits, so as to reduce data quantity. In order to efficiently decrease redundant data in image or video contents while maintaining image quality, the prior art provides a block coding technique, which samples an image into units (or named blocks) each having pixels arranged as an n×m matrix, and performing operations, such as encoding, decoding, etc.

Block coding schemes are generally classified into two groups, coding in transform domain and coding in spatial domain.

In the coding in transform domain, after an image is sampled into a plurality of blocks, pixels of each block undergo time to frequency transformation by multiplying the pixels by orthogonal bases of a coordinate (or transformation coefficients), quantization, bit allocation, and entropy coding to output coded data. Among various time to frequency transformations, discrete cosine transform (DCT) is the most popular one. Computed DCT data is transformed from spatial domain to frequency domain according to visual characteristics of human eyes. For example, human eyes are less sensitive to high-frequency variations such that high-frequency parts of an image are quantized in a lager step size and low-frequency parts of an image are quantized in a smaller step size. For efficiently recording information of the low-frequency parts, the computed DCT coefficients are weighted by a quantization table followed by a zig-zag scanning and run-length coding, so as to encode the higher-frequency data by the shorter code words and the lower-frequency data by the longer code words.

In the other group, coding in spatial domain is coding each block without any transformation after an image is partitioned into a plurality of blocks. Popular methods of spatial domain coding are vector quantization (VQ) coding and differential pulse code modulation (DPCM). Take vector quantization coding for example, after an image is partitioned into a plurality of blocks, pixels of each block, from left to right and top to bottom, form a vector. Representative vectors are grouped into a codebook for encoding. The prior art has provided methods and processes of spatial domain coding.

Coding in transform domain and coding in spatial domain encode a plurality of blocks of an image. However, both of them have limitations or shortcomings. First, Coding in transform domain requires steps of bit allocation and variable length coding so that applications requiring fixed length coding or parallel computation are prohibited. On the other hand, though coding in spatial domain allows fixed length coding, a complicated encoding scheme and a huge codebook size are required as a block length increases.

SUMMARY OF THE INVENTION

It is therefore an object of the claimed invention to provide a method of block encoding and decoding of an image.

The present invention discloses a method of block encoding of an image including partitioning an image into a plurality of blocks each having a plurality of pixels corresponding to a first matrix, obtaining a first block from the plurality of blocks, rearranging pixels of the first block for generating a second block according to an arrangement rule, performing wavelet transformation for the second block for generating a third block having a plurality of wavelet coefficients corresponding to the first matrix; rearranging the wavelet coefficients of the third block for generating a fourth block according to the arrangement rule, quantizing the fourth block, and encoding a quantized result of the fourth block.

The present invention further discloses a method of block decoding of an image including receiving pixels of a first block, determining a bit allocation of the first block and an encoding prediction direction, decoding the first block into a second block having a plurality of wavelet coefficients corresponding to a first matrix according to the encoding prediction direction, rearranging the plurality of wavelet coefficients of the second block for generating a third block according to an arrangement rule, performing inverse wavelet transformation for generating a fourth block having a plurality of pixels corresponding to the first matrix, rearranging the plurality of pixels of the fourth block for generating a fifth block according to the arrangement rule, and outputting the fifth block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a schematic diagram of a 4×4 block.

FIG. 5 illustrates a schematic diagram of performing wavelet transformation for each sub-block of the block in FIG. 4.

FIG. 8 illustrates a schematic diagram of a bit allocation of non-refinement quantization.

FIG. 9 illustrates a schematic diagram of a bit allocation of refinement quantization.

DETAILED DESCRIPTION

For improving the shortcomings of the prior art, the present invention combines coding in transform and spatial domains so as to adapt to applications requiring parallel computation and fixed length coding.

Figure 1:
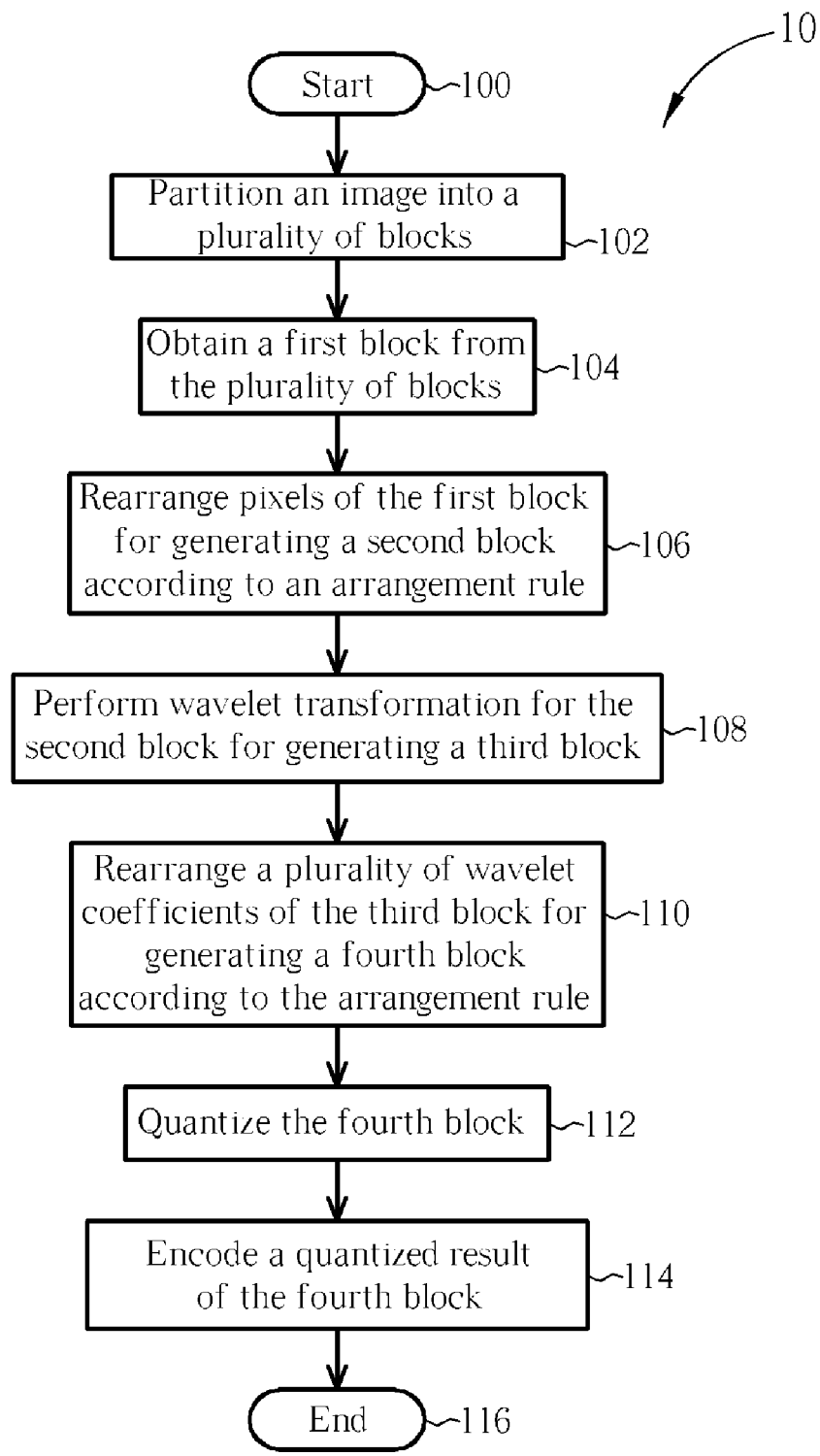
FIG. 1 depicts a flowchart diagram of block encoding of an image according to an embodiment of the present invention.

Please refer to FIG. 1. FIG. 1 is a flowchart diagram of a process 10 according to an embodiment of the present invention. The process 10 realizes block encoding of an image, and includes following steps:

Step 100: Start.

Step 102: Partition an image into a plurality of blocks each having a plurality of pixels corresponding to a first matrix.

Step 104: Obtain a first block from the plurality of blocks.

Step 106: Rearrange pixels of the first block for generating a second block according to an arrangement rule.

Step 108: Perform wavelet transformation for the second block for generating a third block having a plurality of wavelet coefficients corresponding to the first matrix.

Step 110: Rearrange the wavelet coefficients of the third block for generating a fourth block according to the arrangement rule.

Step 112: Quantize the fourth block.

Step 114: Encode a quantized result of the fourth block.

Step 116: End.

Therefore, according to the process 10, the present invention partitions an image into a plurality of blocks, rearranges pixels of each block according to an arrangement rule, performs wavelet transformation for each block for obtaining wavelet coefficients, rearranges the wavelet coefficients of each block according to the same arrangement rule so as to perform quantizing and encoding. In short, the present invention disarranges pixels of each block firstly, obtains wavelet coefficients of each block, recovers the arrangement of the wavelet coefficients, and performs quantizing and encoding at last. Preferably, the step 102 partitions the image into a plurality of blocks each corresponding to a 4×4 matrix. The step 106 can increase the relationship between the plurality of sub-blocks in each block based on the arrangement rule, such as replacing the pixel at ((2i+m), (2j+n)) with the pixel at ((2m+i), (2n+j)). The step 108 can perform wavelet transformation to obtain high-frequency and low-frequency parts of each block, the step 110 groups the high-frequency and low-frequency parts of each block in specific sub-blocks respectively. Due to insensitivity of human eyes to high-frequency variation, the factor affecting image quality is mostly related to the low-frequency (or DC) parts of an image. In other words, the low-frequency parts dominate a refinement scale of an image for human eyes. The lower refinement shows up in an image, the larger difference of inter-pixel is. Therefore, in the step 112, a refinement scale of an image can determine a required number of bits of the low-frequency and high-frequency parts of the quantized image as well as bit allocation. After the step 112 has been accomplished, the step 114 encodes the quantized result.

As those skilled in the art recognized, wavelet transformation is extended from Fourier transformation. The difference between wavelet transformation and Fourier transformation is that wavelet transformation is based on wavelet functions, while Fourier transformation is based on Trigonometric Functions. "Wavelet" is defined as a waveform with a finite length and zero mean value so that a wavelet function is a partial function on both time domain and frequency domain. Wavelet transformation functions to stretch or compress wave functions for shifting signals for analysis segment by segment and for expanding signals for analysis. In practical applications, discrete wavelet functions are widely used in the way of applying a low-pass filter and a high-pass filter for analyzing low-frequency approximate coefficients and high-frequency detail coefficients in order to perform encoding so that the advantage is reducing the computation load. In other words, an image includes high-frequency and low-frequency components after being performed by discrete wavelet transformation, Thus, the present invention utilizes wavelet transformation to obtain the high-frequency and low-frequency parts of each block, and determines the number of quantization bits for the high-frequency and low-frequency parts according to the refinement scale when performing quantization so as to maintain image quality Implementations of wavelet transformation are well known in the art, which will not be narrated in detail. Preferably, the present invention utilizes 2×2 Haar wavelet transformation for obtaining wavelet coefficients of each block, and determines bit allocation according to a refinement scale of wavelet coefficients for a quantization process so as to perform differential pulse code modulation or other encoding methods in the way of encoding the quantized result by fixed-number bits. Therefore, the present invention is suitable for use in applications requiring fixed length coding or parallel computation and avoids a complicated encoding scheme and a huge codebook size.

In short, after an image is partitioned into a plurality of 4×4 blocks, the process 10 begins with rearranging pixels of each 4×4 block for raising correlation between each 2×2 sub-block, steps forward to perform two-dimensional 2×2 Haar wavelet transformation for obtaining low-frequency wavelet coefficients and high-frequency wavelet coefficients of each 2×2 sub-block, steps forward to group the low-frequency wavelet coefficients and the high-frequency wavelet coefficients of all sub-blocks, and determines bit allocation according to a refinement scale of the low-frequency wavelet coefficients and the high-frequency wavelet coefficients so as to perform quantization and differential pulse code modulation in the last step. Therefore, the present invention is suitable for applications requiring fixed length coding or parallel computation and avoids a complicated encoding scheme and a huge codebook size.

Figure 3:
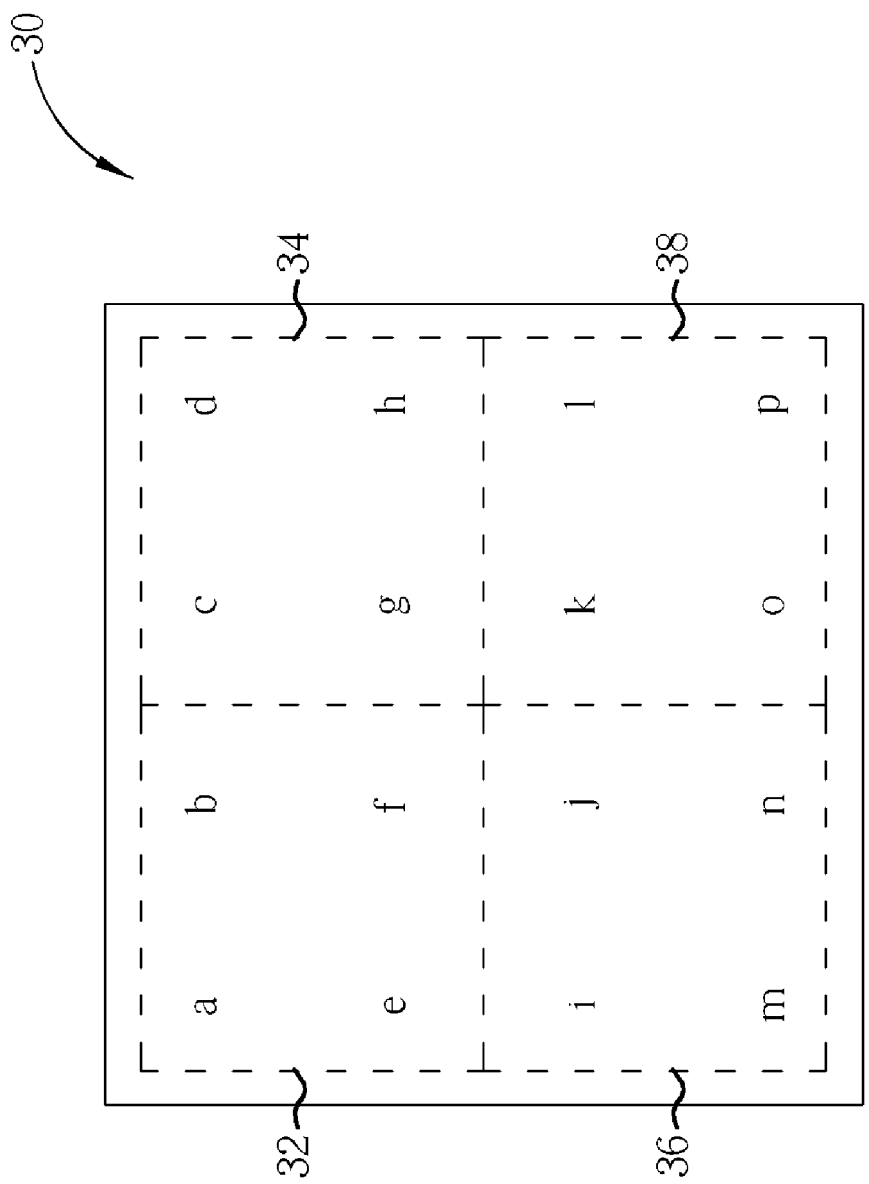
FIG. 3 illustrates a schematic diagram of a pixel arrangement of a block.

As to an implementation of the process 10, please refer to FIG. 2. FIG. 2 illustrates a schematic diagram of a 4×4 block 20. After an image is partitioned into a plurality of 4×4 blocks, the pixels of each 4×4 block can be represented as the pixels of the block 20, where p(n,m) represents a pixel locating at a coordinate (n,m) of a matrix. The pixel values of p(0,0), p(0,1) ... p(3,3) of a block 30 are a, b, ... p, as shown in FIG. 3. The present invention replaces the pixel value of the matrix coordinate ((2i+m), (2j+n)) with the pixel value of the matrix coordinate ((2m+i), (2n+j)) in accordance with the arrangement rule applying to the block 30 as follows:

$$p((2i+m), (2j+n)) \leftarrow p((2m+i), (2n+j)),$$

where m, n, i, j belong to $\{0,1\}$

Figure 4:
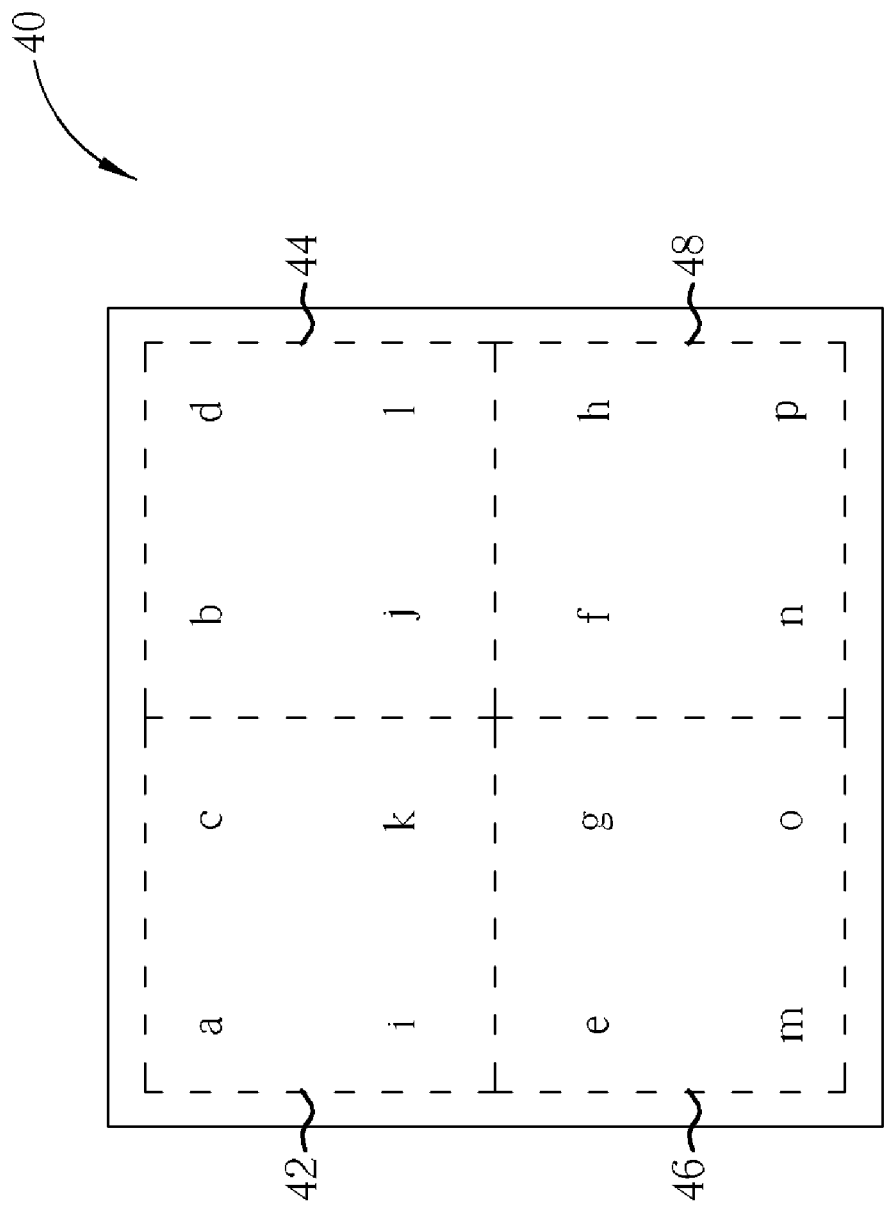
FIG. 4 illustrates a schematic diagram of a pixel arrangement after rearranging the block in FIG. 3 according to an arrangement rule.

Please refer to FIG. 4. FIG. 4 illustrates a schematic diagram of a block 40. The block 40 shows the arrangement of the pixels after the pixels of the block 30 are rearranged in accordance with the arrangement rule above. FIG. 4 indicates that the block 40 can be seen as a combination of four 2×2 sub-blocks 42, 44, 46, and 48. The correlation between the four sub-blocks 42, 44, 46, and 48 can be increased after the arrangement rule is performed on the block 30. FIG. 3 indicates that the block 30 can be seen as a combination of the four 2×2 sub-blocks 32, 34, 36, and 38. According to properties of an image, pixels highly related to a pixel are neighboring pixels of the pixel. Therefore, for the four sub-blocks 32, 34, 36, and 38, the correlation stands high in the inter-pixels of each block while the correlation stands low in the inter-sub-blocks. By taking the block 32 as an instance, the pixels a, b, e, and f are neighboring pixels so that the correlation between the four pixels is quite high while there is almost no correlation between the sub-block 32 and the sub-block 38. Through rearranging the above arrangement rule, the sub-blocks 42, 44, 46, and 48 include the partial pixels of the sub-blocks 32, 34, 36, and 38, respectively. An instance as the sub-block 42 shows that the four pixels a, c, i, and k of the sub-block 42 originally lie in the four sub-blocks 32, 34, 36, and 38 respectively. Therefore, the arrangement rule can increase correlation between inter-sub-blocks while lowering correlation between inter-pixels of the sub-blocks 42, 44, 46, and 48.

Figure 5:
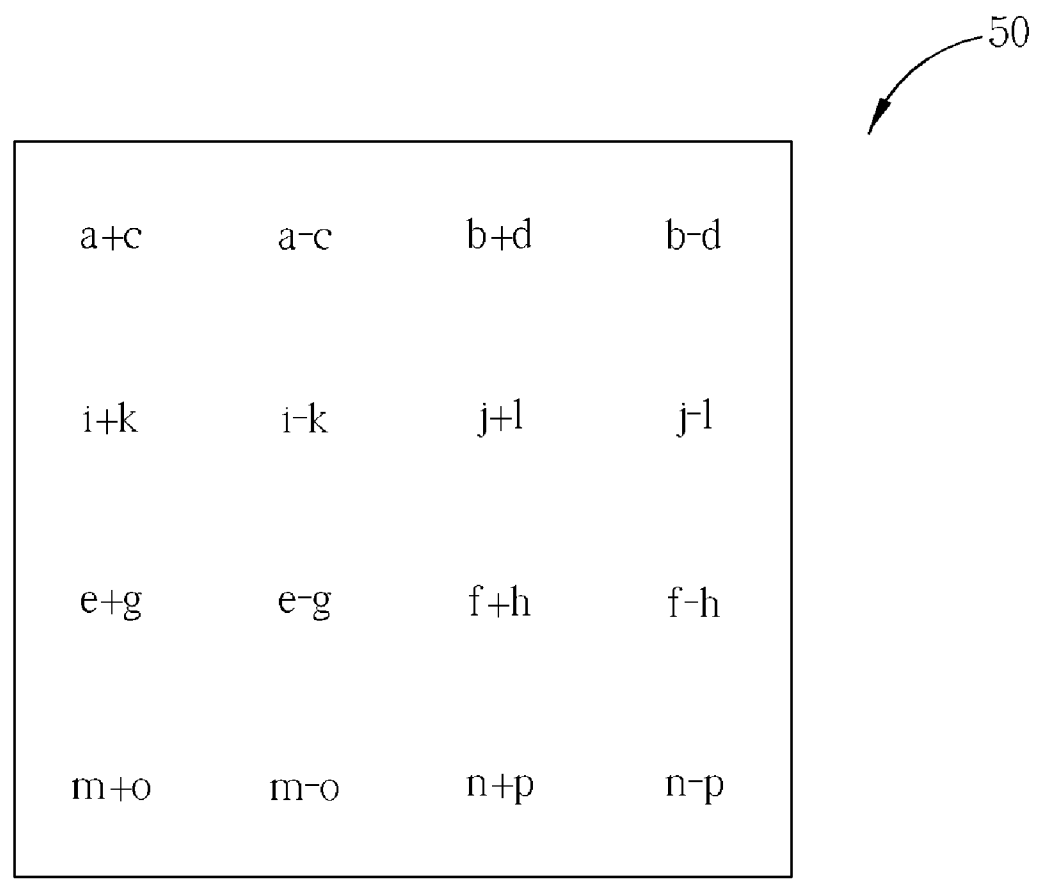
Figure 6:
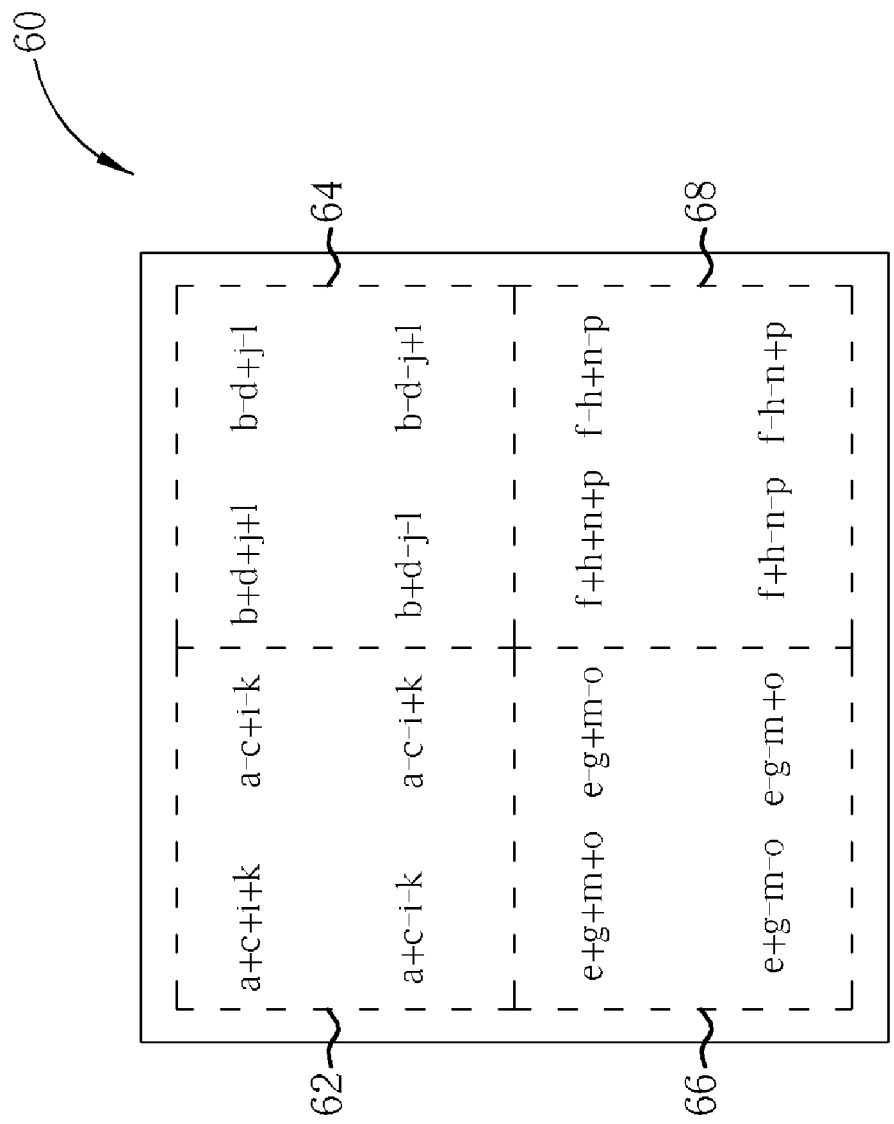
FIG. 6 illustrates a schematic diagram of performing wavelet transformation for each sub-block of the block in FIG. 4.
Figure 7:
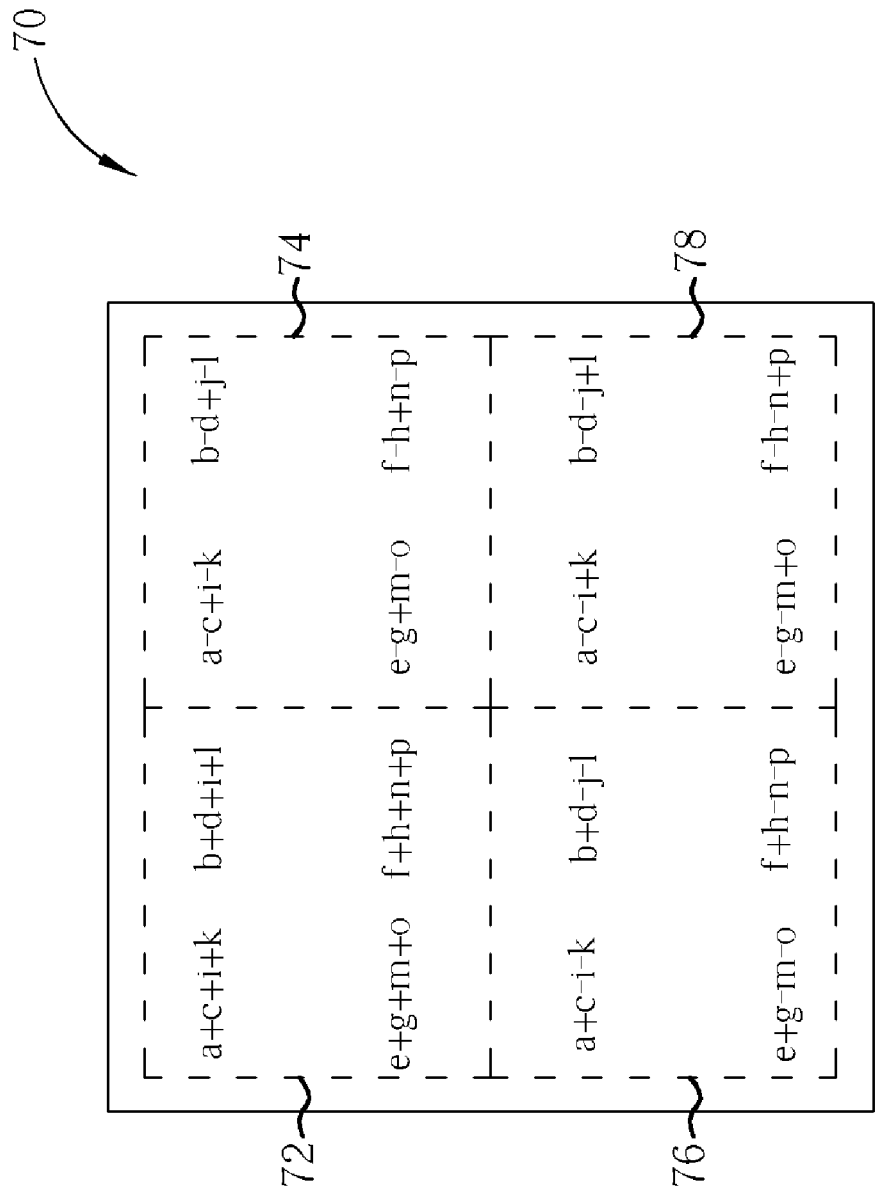
FIG. 7 illustrates a schematic diagram of a wavelet-coefficient arrangement after rearranging the block in FIG. 6 according to an arrangement rule.

Subsequently, perform two-dimensional wavelet transformation for each sub-block of the block 40. For simplicity, a high-pass filter [−1,1] and a low-pass filter [1, 1] can be employed in performing Haar wavelet transformation for each sub-block of the block 40. Please note that the effect of Haar wavelet transformation is same as that of Hadmard transformation in the foregoing case. Please refer to FIG. 5 and FIG. 6. Due to 2-taps filters, the two-stage operation calculates filtering results of the rows and the columns of each sub-block of the block 40, and generates a block 50 and a block 60 respectively. In FIG. 6, wavelet coefficients at the left-top part of sub-blocks 62, 64, 66, and 68 are outcomes of low-pass filtering while wavelet coefficients at the other three parts are outcomes of high-pass filtering. As the mentioned above, the key dominating image quality is low-frequency (or DC) parts of an image. In other words, the wavelet coefficients at the left-top part of the sub-blocks 62, 64, 66, and 68 are highly related to image quality. In order to group high-correlation wavelet coefficients and low-correlation wavelet coefficients respectively, the block 60 uses the same arrangement rule, p((2i+m), (2j+n))←p((2m+i), (2n+j)), for rearranging wavelet coefficients at the same frequency band into the same sub-blocks, as a block 70 shown in FIG. 7. A sub-block 72 in the block 70 includes the wavelet coefficients at the left-top part of the sub-blocks 62, 64, 66, and 68 such that all the wavelet coefficients of the sub-block 72 are high-correlation wavelet coefficients, or DC parts of an image. In comparison, the wavelet coefficients of the other three sub-blocks 74, 76, and 78 are low-correlation wavelet coefficients, or alternating-current (AC) parts of an image.

For human eyes, low-frequency parts of an image are acceptable and more sensitive by nature. If differences between inter-pixels of the low-frequency parts are small, the image is smooth and clear. Human eyes can easily distinguish changes in the low-frequency parts. Therefore, an image must be encoded based on the properties, so as to maintain image quality. For example, if there is little difference between inter-pixels of the block 30, then in the block 70, the four pixel values of the (high-correlation) sub-block 72 approximate to a specific value while the pixel values of the other three (low-correlation) sub-blocks 74, 76, and 78 approximate to a small value or zero. Oppositely, if there is large difference between inter-pixels of the block 30, meaning that the pixel values of the block 30 behave in a low-refinement manner, then the pixel values of the other three (low-correlation) sub-blocks 74, 76, and 78 appear large difference. Therefore, the present invention determines a quantization scale according to a refinement scale of a block so as to quantize wavelet coefficients of the block 70.

To determine the refinement scale of the block 30, we first determine whether the wavelet coefficients of the block 70 hold the following refinement conditions. The refinement conditions include:

(abs(p(1,0)−p(0,0))<127),
(abs(p(0,1)−p(0,0))<127),
(abs(p(1,1)−p(1,0))<127),
(abs(p(1,1)−p(0,1))<127),
(abs(p(0,2))<127),
(abs(p(0,3))<127),
(abs(p(1,2))<127),
(abs(p(0,3)−p(0,2))<127),
(abs(p(1,3)−p(1,2))<127),
(abs(p(1,2)−p(0,2))<127),
(abs(p(1,3)−p(0,3))<127),
(abs(p(2,0))<127),
(abs(p(2,1))<127),
(abs(p(3,0))<127),
(abs(p(2,1)−p(2,0))<127),
(abs(p(3,1)−p(3,0))<127),
(abs(p(3,0)−p(2,0))<127),
(abs(p(3,1)−p(2,1))<127)
(abs(p(2,2))<127),
(abs(p(2,3))<127),
(abs(p(3,2))<127),
(abs(p(2,3)−p(2,2))<127),
(abs(p(3,3)−p(3,2))<127),
(abs(p(3,2)−p(2,2))<127), and
(abs(p(3,3)−p(2,3))<127).

The abs(x) operation denotes the absolute value of x, and p(a,b) denotes the pixel value at the matrix coordinate (a,b) of the block 70, where 0≦a, b≦3.

Figure 8:
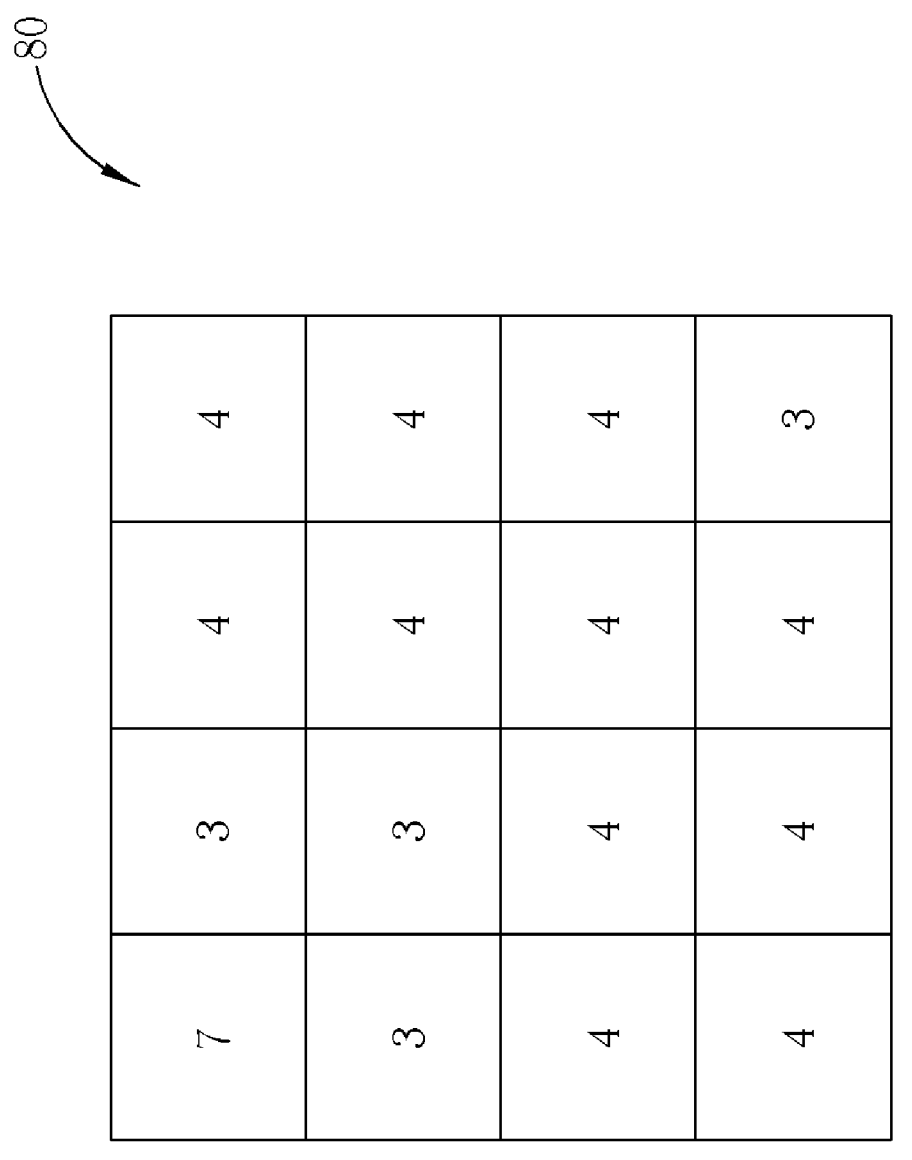
Figure 9:
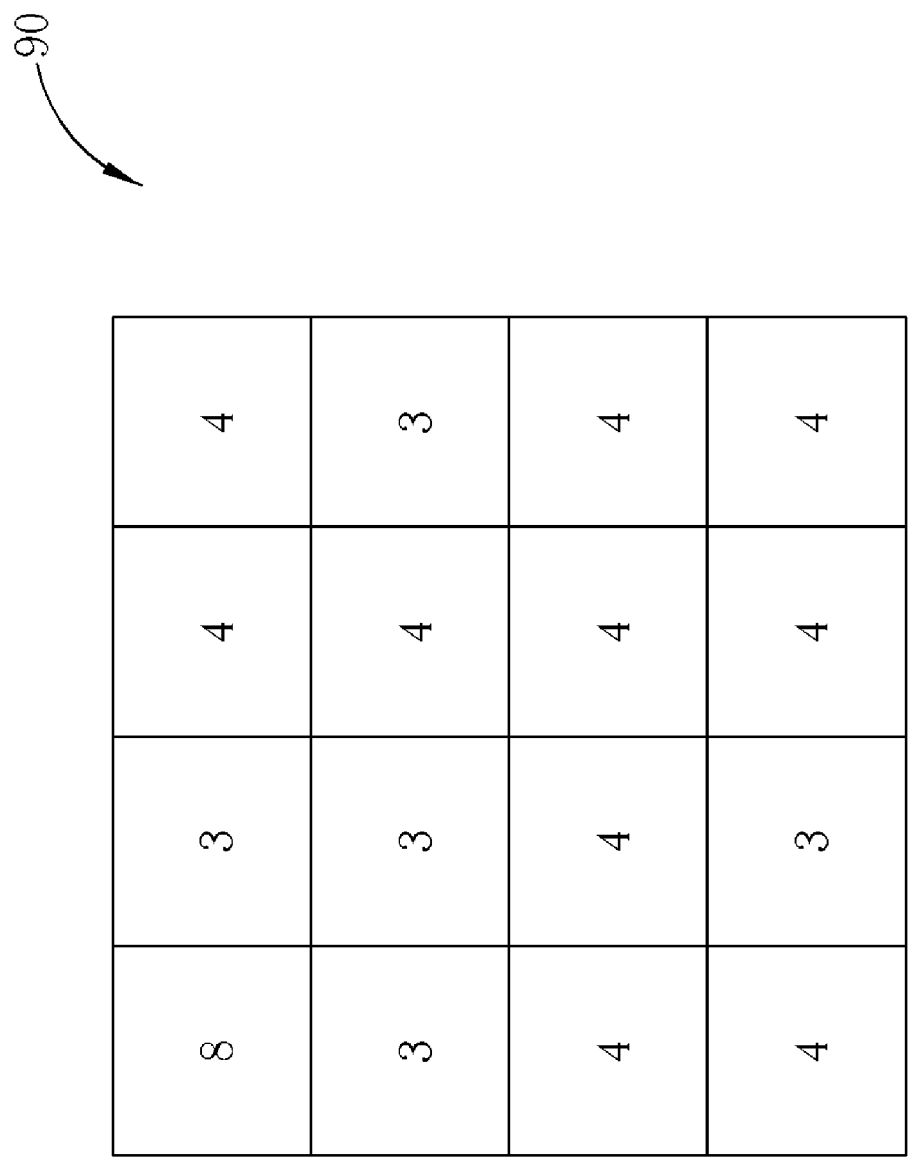

After determining the refinement scale of the wavelet coefficients of the block 70 via the above inequalities, the next step is to determine bit allocation. There are various ways of bit allocation. Take fixed-rate coding with a 1/2 compression ratio for example. Sixteen 8-bit pixels of a 4×4 block are coded into 63 bits and a refinement bit. Please refer to FIG. 8 and FIG. 9. The present invention provides a bit allocation scheme 80 and a bit allocation scheme 90 respectively corresponding to a non-refinement quantization and a refinement quantization. The values in the bit allocation schemes 80 and 90 correspond to the numbers of quantization bits of each wavelet coefficient of the block 70, respectively. Compared FIG. 8 with FIG. 9, please note that the bit allocation scheme 90 uses one more refinement bit than the bit allocation scheme 80 for quantizing the wavelet coefficients at the left-top part of the high-correlation sub-block 72 to adapt to a more refined image.

In the block 70, a wavelet coefficient p(0,0), corresponding to the block 20 in FIG. 2, appears to a value in a range from 0 to 1020. When the wavelet coefficients of the block 70 do not hold every refinement condition, the non-refined quantization corresponding to the bit allocation scheme 80 is adopted to quantize the block 70, the wavelet coefficient p(0,0) of which is quantized to 7 bits by round off. Please note that p'(0,0) denotes the 7-bit, round-off, and quantized p(0,0). As for the wavelet coefficients p(0,1) and p(1,0) of the (high-correlation) sub-block 72, the present invention uses differential pulse code modulation (DPCM) for predicting p'(0,1) and p'(1,0), the quantized p(0,1) and the quantized p(1,0), by p'(0,0) as a predictor here. After obtaining p'(0,1) and p'(1,0), either a row direction prediction or a column direction prediction is chosen for predicting p'(1,1), the quantized p(1,1), where the row direction prediction uses p'(1,0) as a predictor for the prediction, while the column direction prediction uses p'(0,1) as a predictor for the prediction. On the other hand, correlation between the twelve wavelet coefficients of the (low-correlation) sub-blocks 74, 76, and 78 is weaker than correlation between the wavelet coefficients of the sub-block 72 so that the prediction direction used in the sub-blocks 74, 76, and 78 follows the same direction used in the sub-block 72, described in details as below. If the row prediction direction is used, the wavelet coefficients p(0,2) and p(1,2) are quantized to 4-bit-long p'(0,2) and p'(1,2) by round off. Subsequently, p'(0,3) and p'(1,3), the quantized p(0,3) and the quantized p(1,3), are computed by differential pulse code modulation, where their predictors are p'(0,2) and p'(1,2) respectively. If the column prediction direction is used, the wavelet coefficients p(0,2) and p(0,3) are quantized to 4-bit-long p'(0,2) and p'(0,3) by round off. Subsequently, p'(1,2) and p'(1,3), or the quantized p(1,2) and the quantized p(1,3), are computed by differential pulse code modulation, where their predictors are p'(0,2) and p'(0,3) respectively. And so forth, other quantized wavelet coefficients can be predicted according to the prediction direction used in the sub-block 72.

On the other hand, when the wavelet coefficients of the sub-block 70 hold the whole refinement conditions, the refined quantization corresponding to the bit allocation scheme 90 is adopted to quantize the block 70. The bit allocation scheme 90 provides twice a refinement scale than the bit allocation scheme 80 does by employing additional refinement bits, making p(0,0) of the block 70 quantized to 8 bits instead of 7 bits by round-off. Therefore, p'(0,0), the quantized p(0,0) of the block 70, denotes the 8-bit, round-off, and quantized p(0,0). The following steps, similar to the steps in the non-refinement coding case, are to determine the prediction direction at first, and to obtain the quantized wavelet coefficients by differential pulse code modulation.

Therefore, the block 70 comes out after the block 30 undergoes the steps of pixel rearrangement, wavelet transformation, and wavelet coefficient rearrangement. Then, we determine whether to do refinement quantization or non-refinement quantization for the block 70, and take the non-refinement quantization according to the bit allocation scheme 80 or the refinement quantization according to the bit allocation scheme 90. Note that, the bit allocation scheme 80 and the bit allocation scheme 90 are preferred embodiments of the present invention, used for descriptions, not for limitations. For example, the bit allocation scheme 80 and the bit allocation scheme 90 can be adjusted to provide a specific refinement scale.

In the implementation of the non-refinement quantization and refinement quantization, the foregoing process is programmable via C language, assembly language, etc. Take a C language case as an embodiment, where B(a,b) represents the bits to code the wavelet coefficient p(a,b) of the block 70, functions dpcm3b(a,b), invdpcm3b(a,b), dpcm4b(a,b), and invdpcm4b(a,b) represent DPCM 3-bit encoding, inverse DPCM of 3-bit-encoding, DPCM 4-bit encoding, and inverse DPCM of 4-bit-encoding, functions quant4b(a,b), quant3b(a,b), invquant4b(a,b), and invquant3b(a,b) represent 3-bit scalar quantization, inverse of 3-bit-scalar-quantization, 4-bit scalar quantization, and inverse of 4-bit-scalar-quantization.

For non-refinement encoding and quantization in C programming code:

```
B(0,0)= (p(0,0)+4)>> 3;
p'(0,0)=B(0,0);
B(0,1) =dpcm3b( p'(0,0),p(0,1));
B(1,0)= dpcm3b( p'(0,0),p(1,0));
```

-continued

```
p'(0,1)=invdpcm3b( p'(0,0),B(0,1));
p'(1,0)=invdpcm3b( p'(0,0),B(1,0));
if(abs( p'(0,0) - p'(0,1) )<=abs( p'(0,0)- p'(1,0)))
row_prediction=1;
else
row_prediction=0;
if(row_prediction) {
B(1,1)=dpcm3b( p'(1,0),p(1,1));
p'(1,1)=invdpcm( p'(1,0),B(1,1));
B(0,2)=quant4b(p(0,2));
B(1,2)=quant4b(p(1,2));
B(2,0)=quant4b(p(2,0));
B(3,0)=quant4b(p(3,0));
B(2,2)=quant4b(p(2,2));
B(3,2)=quant4b(p(3,2));
p'(0,2)=invquant4b(B(0,2));
 p'(1,2)=invquant4b(B(1,2));
 p'(2,0)=invquant4b(B(2,0));
 p'(3,0)=invquant4b(B(3,0));
 p'(2,2)=invquant4b(B(2,2));
 p'(3,2)=invquant4b(B(3,2));
 B(0,3)=dpcm4b( p'(0,2),p(0,3));
 B(1,3)=dpcm4b( p'(1,2),p(1,3));
 B(2,1)=dpcm4b( p'(2,0),p(2,1));
 B(3,1)=dpcm4b( p'(3,0),p(3,1));
 B(2,3)=dpcm4b( p'(2,2),p(2,3));
 B(3,3)=dpcm3b( p'(3,2),p(3,3));}
else {
B(1,1)=dpcm3b( p'(0,1),p(1,1));
p'(1,1)=invdpcm3b( p'(0,1),B(1,1));
B(0,2)=quant4b(p(0,2));
B(0,3)=quant4b(p(0,3));
B(2,0)=quant4b(p(2,0));
B(2,1)=quant4b(p(2,1));
B(2,2)=quant4b(p(2,2));
B(2,3)=quant4b(p(2,3));
p'(0,2)=invquant4b(B(0,2));
p'(0,3)=invquant4b(B(0,3));
p'(2,0)=invquant4b(B(2,0));
p'(2,1)=invquant4b(B(2,1));
p'(2,2)=invquant4b(B(2,2));
p'(2,3)=invquant4b(B(2,3));
B(1,2)=dpcm4b( p'(0,2),B(1,2));
B(1,3)=dpcm4b( p'(0,3),B(1,3));
B(3,0)=dpcm4b( p'(2,0),B(3,0));
B(3,1)=dpcm4b( p'(2,1),B(3,1));
B(3,2)=dpcm4b( p'(2,2),B(3,2));
B(3,3)=dpcm3b( p'(2,3),B(3,3));
}
```

For refinement encoding and quantization in C programming code:

```
p'(0,0) =p(0,0);
B(0,0)= p'(0,0);
B(0,1)=dpcm3b( p'(0,0),p(0,1));
p'(0,0)=invdpcm3b( p'(0,0), B(0,1));
B(1,0)=dpcm3b( p'(0,0),p(1,0));
p'(1,0)=invdpcm3b( p'(0,0), B(1,0));
if(abs( p'(0,0) - p'(0,1) )<=abs( p'(0,0)- p'(1,0)))
row_prediction=1;
else
row_prediction=0;
if(row_prediction) {
B (1,1)=dpcm3b( p'(1,0),p(1,1));
B (0,2)=quant4b(p(0,2));
B(1,2)=quant4b(p(1,2));
B (2,0)=quant4b(p(2,0));
B(3,0)=quant4b(p(3,0));
B (2,2)=quant4b(p(2,2));
B(3,2)=quant4b(p(3,2));
p'(0,2)=invquant4b(B(0,2));
p'(1,2)=invquant4b(B(1,2));
p'(2,0)=invquant4b(B(2,0));
p'(3,0)=invquant4b(B(3,0));
```

-continued

```
    p'(2,2)=invquant4b(B(2,2));
    p'(3,2)=invquant4b(B(3,2));
    B (0,3)=quant4b(p(0,3)- p'(0,2))+ p'(0,2);
    B (1,3)=quant3b(p(1,3)- p'(1,2))+ p'(1,2);
    B (2,1)=quant4b(p(2,1)- p'(2,0))+ p'(2,0);
    B (3,1)=quant3b(p(3,1)- p'(3,0))+ p'(3,0);
    B (2,3)=quant4b(p(2,3)- p'(2,2))+ p'(2,2);
    B (3,3)=quant4b(p(3,3)- p'(3,2))+ p'(3,2);}
    else {
    B (1,1)=dpcm3b( p'(0,1),p(1,1));
    B (0,2)=quant4b(p(0,2));
    B (0,3)=quant4b(p(0,3));
    B (2,0)=quant4b(p(2,0));
    B (2,1)=quant4b(p(2,1));
    B (2,2)=quant4b(p(2,2));
    B (2,3)=quant4b(p(2,3));
    p'(0,2)=invquant4b(B (0,2));
    p'(0,3)=invquant4b(B(0,3));
    p'(2,0)=invquant4b(B (2,0));
    p'(2,1)=invquant4b(B(2,1));
    p'(2,2)=invquant4b(B (2,2));
    p'(2,3)=invquant4b(B(2,3));
    B (1,2)=quant4b(p(1,2)- p'(0,2));
    B (1,3)=quant3b(p(1,3)- p'(0,3));
    B (3,0)=quant4b(p(3,0)- p'(2,0));
    B (3,1)=quant3b(p(3,1)- p'(2,1));
    B (3,2)=quant4b(p(3,2)- p'(2,2));
    B (3,3)=quant4b(p(3,3)- p'(2,3));
    }
```

Note that, the C programming codes above are embodiments of the non-refinement quantization and the refinement quantization. The process 10 can be implemented in various programming languages. Furthermore, instead of two-dimensional 2×2 Haar wavelet transformation, any eligible wavelet transformation can be employed to obtain high-frequency wavelet coefficients and low-frequency wavelet coefficients of a block. Similarly, differential pulse code modulation can be applied.

In short, the present invention combines the transform domain coding and the spatial domain coding, and includes partitioning an image into a plurality of blocks, rearranging pixels of the plurality of blocks, performing wavelet transformation, rearranging wavelet coefficients, and performing quantization and encoding. Therefore, the present invention applies to applications requiring parallel computation and fixed length coding and avoids a complicated encoding scheme and a huge codebook size.

Figure 10:
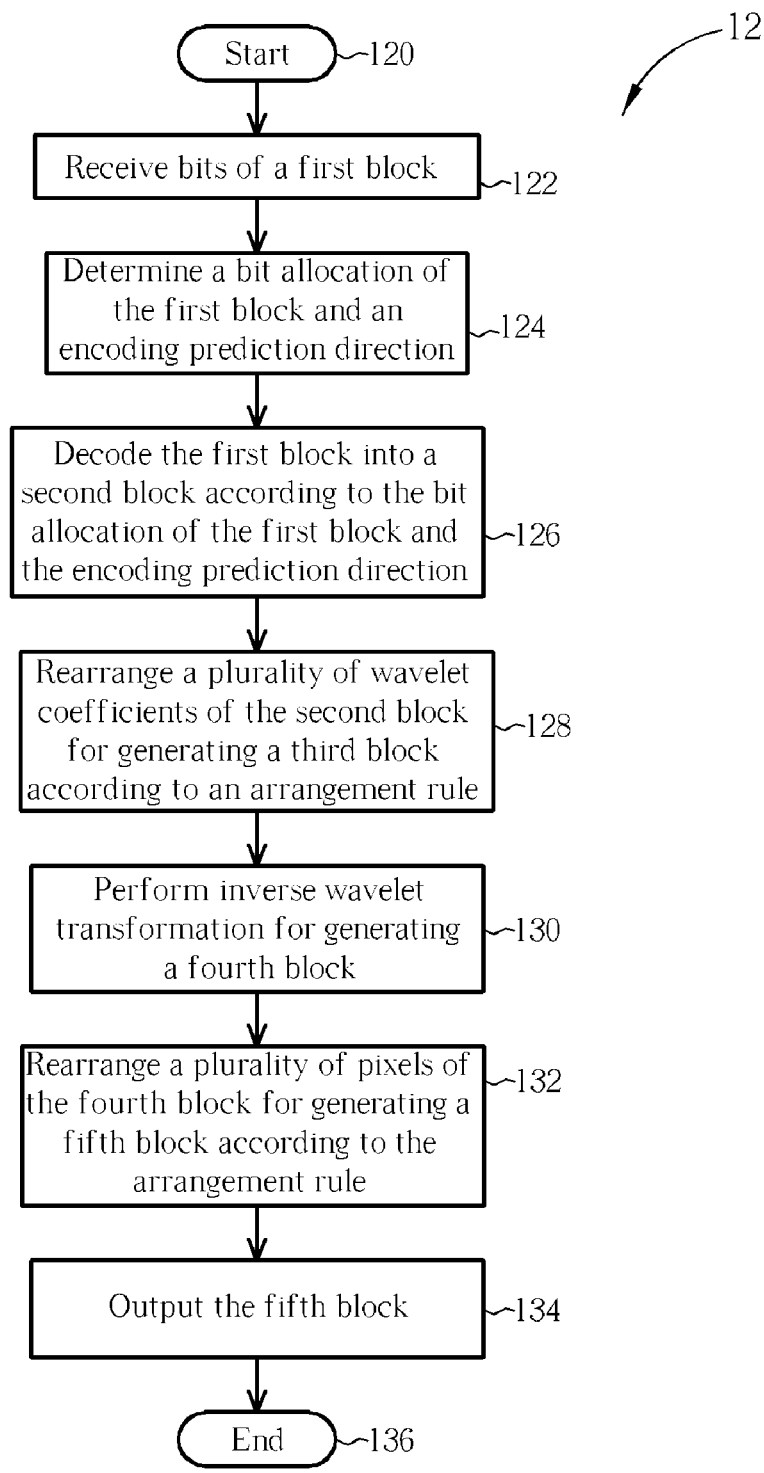
FIG. 10 depicts a flowchart diagram of block decoding of an image according to an embodiment of the present invention.

Contrary to the block encoding process 10, the block decoding is an inverse procedure. Please refer to FIG. 10. FIG. 10 depicts a flowchart diagram of a process 12 of block decoding of an image according to an embodiment of the present invention. The process 12 includes steps as follows:

Step 120: Start.

Step 122: Receive bits of a first block.

Step 124: Determine a bit allocation of the first block and an encoding prediction direction.

Step 126: Decode the first block into a second block having a plurality of wavelet coefficients corresponding to a first matrix according to the bit allocation of the first block and the encoding prediction direction.

Step 128: Rearrange the plurality of wavelet coefficients of the second block for generating a third block according to an arrangement rule.

Step 130: Perform inverse wavelet transformation for generating a fourth block having a plurality of pixels corresponding to the first matrix.

Step 132: Rearrange the plurality of pixels of the fourth block for generating a fifth block according to the arrangement rule.

Step 134: Output the fifth block.

Step 136: End.

According to the process 12, block decoding is an inverse procedure to block encoding. First, a bit stream of a first block is received from a signal channel in step 122. According to a refinement bit, step 124 determines whether a refinement quantization is used or not, so as to decide a corresponding bit allocation. After deciding the corresponding bit allocation, values at low-frequency parts are computed for determining the encoding prediction direction by an inverse quantization scheme. Thus, low-frequency and high-frequency wavelet coefficients are decoded for generating a second block in step 126. In step 128, rearranging the wavelet coefficients of the second block for generating a third block according to the same arrangement procedure, p'((2i+m), (2j+n))←p'((2m+i), (2n+j)) as the one in the encoding case. Step 130 performs inverse wavelet transformation on the third block for obtaining a fourth block. At last, according to the same arrangement rule, p((2i+m), (2j+n))←p((2m+i), (2n+j)), pixels of the fourth block are rearranged for obtaining a fifth block, a decoding result.

From the above, block decoding is an inverse procedure to block encoding, so that the process 12 can be implemented by the same means of programming code, such as C language, assembly language, and so on. Take a C language case as an embodiment of the step 126, where the definitions of the relevant parameters and functions are the same as the foregoing encoding case. The C programming code is listed as follows:

```
If(B(refinement)){
p'(0,0) = B(0,0);
p'(0,1)=invdpcm3b( p'(0,0),B(0,1));
p'(1,0)=invdpcm3b( p'(0,0),B(1,0));
if(abs( p'(0,0) - p'(0,1) )<=abs( p'(0,0)- p'(1,0)))
row_prediction=1;
else
row_prediction=0;
if(row_prediction) {
p'(1,1)=invdpcm3b( p'(1,0),B(1,1));
p'(0,2)=invquant4b(B(0,2));
p'(1,2)=invquant4b(B(1,2));
p'(2,0)=invquant4b(B(2,0));
p'(3,0)=invquant4b(B(3,0));
p'(2,2)=invquant4b(B(2,2));
p'(3,2)=invquant4b(B(3,2));
p'(0,3)=invquant4b(B(0,3))+ p'(0,2);
p'(1,3)=invquant3b(B(1,3) )+ p'(1,2);
p'(2,1)=invquant4b(B(2,1))+ p'(2,0);
p'(3,1)=invquant3b(B(3,1))+ p'(3,0);
p'(2,3)=invquant4b(B(2,3))+ p'(2,2);
p'(3,3)=invquant4b(B(3,3))+ p'(3,2);}
else {
p'(1,1)=invdpcm3b( p'(0,1),B(1,1));
p'(0,2)=invquant4b(B(0,2));
p'(0,3)=invquant4b(B(0,3));
p'(2,0)=invquant4b(B(2,0));
p'(2,1)=invquant4b(B(2,1));
p'(2,2)=invquant4b(B(2,2));
p'(2,3)=invquant4b(B(2,3));
p'(1,2)=invquant4b(B(1,2))+ p'(0,2);
p'(1,3)=invquant3b(B(1,3))+ p'(0,3);
p'(3,0)=invquant4b(B(3,0))+ p'(2,0);
p'(3,1)=invquant3b(B(3,1))+ p'(2,1);
p'(3,2)=invquant4b(B(3,2))+ p'(2,2));
p'(3,3)=invquant4b(B(3,3))+ p'(2,3);
}
shift_left_2bits( p');
}
```

-continued

```
else{
p'(0,0)=B(0,0);
p'(0,1)=invdpcm3b( p'(0,0), B(0,1));
p'(1,0)=invdpcm3b( p'(0,0), B(1,0));
if(abs( p'(0,0) - p'(0,1) )<=abs( p'(0,0)- p'(1,0)))
row_prediction=1;
else
row_prediction=0;
if(row_prediction) {
p'(1,1)=invdpcm( p'(1,0),B(1,1));
p'(0,2)=invquant4b(B(0,2));
p'(1,2)=invquant4b(B(1,2));
p'(2,0)=invquant4b(B(2,0));
p'(3,0)=invquant4b(B(3,0));
p'(2,2)=invquant4b(B(2,2));
p'(3,2)=invquant4b(B(3,2));
p'(0,3)=invdpcm4b( p'(0,2), B(0,3));
p'(1,3)=invdpcm4b( p'(1,2), B(1,3));
p'(2,1)=invdpcm4b( p'(2,0), B(2,1));
p'(3,1)=invdpcm4b( p'(3,0), B(3,1));
p'(2,3)=invdpcm4b( p'(2,2), B(2,3));
p'(3,3)=invdpcm4b( p'(3,2), B(3,3));
else {
p'(1,1)=invdpcm3b( p'(0,1),B(1,1));
p'(0,2)=invquant4b(B(0,2));
p'(0,3)=invquant4b(B(0,3));
p'(2,0)=invquant4b(B(2,0));
p'(2,1)=invquant4b(B(2,1));
p'(2,2)=invquant4b(B(2,2));
p'(2,3)=invquant4b(B(2,3));
p'(1,2)=invdpcm4b( p'(0,2), B(1,2));
p'(1,3)=invdpcm4b( p'(0,3), B(1,3));
p'(3,0)=invdpcm4b( p'(2,0), B(3,0));
p'(3,1)=invdpcm4b( p'(2,1), B(3,1));
p'(3,2)=invdpcm4b( p'(2,2), B(3,2));
p'(3,3)=invdpcm4b( p'(2,3), B(3,3));
}
shift_left_3bits( p');
}
```

Please note in particular that the C programming code above is an embodiment of the inverse quantization scheme in step 126. Those skilled in the art can use various programming language to implement the relevant steps above.

In conclusion, when block encoding is being processed, the present invention partitions an image into a plurality of blocks, rearranges pixels of the plurality of blocks, performs wavelet transformation, rearranges wavelet coefficients, and performs quantization and encoding. When block decoding is being processed, the present invention decodes digital signals, performs inverse quantization, rearranges wavelet coefficients, performs inverse wavelet transformation, and rearranges pixels of the plurality of blocks. Therefore, under condition of a compression rate, 1/2, the present invention provides a method of block information compression from 128 bits to 64 bits. Certainly, the compression rate is not limited to 1/2. As long as adjusting bit allocation, the present invention is capable of achieving a compression rate needed. In short, the present invention is suitable for applications requiring fixed length coding or parallel computation and avoids a complicated encoding scheme and a huge codebook size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of block encoding of an image comprising:
   partitioning an image into a plurality of blocks each having a plurality of pixels corresponding to a first matrix;
   obtaining a first block from the plurality of blocks;
   rearranging pixels of the first block for generating a second block according to an arrangement rule;
   performing wavelet transformation for the second block for generating a third block having a plurality of wavelet coefficients corresponding to the first matrix;
   rearranging the wavelet coefficients of the third block for generating a fourth block according to the arrangement rule;
   quantizing the fourth block; and
   encoding a quantized result of the fourth block.

2. The method of claim 1, wherein the first matrix is a 4×4 matrix.

3. The method of claim 1, wherein the arrangement rule is mapping a block to a second matrix and replacing a value of the block corresponding to a first coordinate of the second matrix with a value of the block corresponding to a second coordinate of the second matrix.

4. The method of claim 3, wherein the second matrix is a 4×4 matrix.

5. The method of claim 4, wherein the first coordinate is ((2i+m), (2j +n)) and the second coordinate is ((2m+i), (2n+j)), where m, n, i, j are 0 or 1.

6. The method of claim 1, wherein performing wavelet transformation for the second block for generating the third block is partitioning the second block into a plurality of equal-size sub-blocks and performing Haar wavelet transformation for the plurality of equal-size sub-blocks for generating the third block.

7. The method of claim 6, wherein each of the plurality of equal-size sub-blocks comprises pixels corresponding to a third matrix.

8. The method of claim 7, wherein the third matrix is a 2×2 matrix.

9. The method of claim 6, wherein performing Haar wavelet transformation for the plurality of equal-size sub-blocks is applying a low-pass-filtering matrix and a high-pass-filtering matrix for obtaining a low-pass wavelet coefficient and a plurality of high-pass wavelet coefficients of each sub-block.

10. The method of claim 9, wherein the high-pass-filtering matrix is [−1 1] and the low-pass-filtering matrix is [1 1].

11. The method of claim 1, wherein the fourth block comprises a high-correlation sub-block and a plurality of low-correlation sub-blocks, wherein the high-correlation sub-block comprises a plurality of low-pass wavelet coefficients of the third block and the plurality of low-correlation sub-blocks comprise a plurality of high-pass wavelet coefficients of the third block.

12. The method of claim 11, wherein the high-correlation sub-block and the plurality of low-correlation sub-blocks are corresponding to a 2×2 matrix.

13. The method of claim 1, wherein quantizing the fourth block comprises:
   determining a refinement scale of the fourth block; and
   quantizing the fourth block according to the refinement scale of the fourth block.

14. The method of claim 13, wherein determining the refinement scale of the fourth block is mapping the fourth block to a fourth matrix and determining the refinement scale of the fourth block according to a plurality of inequalities.

15. The method of claim 14, wherein the fourth matrix is a 4×4 matrix and the plurality of inequalities comprise:
   (abs(p(1,0)−abs(p(0,0))<127),
   (abs(p(0,1)−abs(p(0,0))<127),
   (abs(p(1,1)−abs(p(1,0))<127),
   (abs(p(1,1)−abs(p(0,1))<127),
   (abs(p(0,2))<127), (abs(p(0,3))<127),
(abs(p(1,2))<127),
(abs(p(0,3))−abs(p(0,2))<127),
(abs(p(1,3)−abs(p(1,2))<127),
(abs(p(1,2)−abs(p(0,2))<127),
(abs(p(1,3)−abs(p(0,3))<127),
(abs(p(2,0))<127),
(abs(p(2,1))<127),
(abs(p(3,0))<127),
(abs(p(2,1)−abs(p(2,0))<127),
(abs(p(3,1)−abs(p(3,0))<127),
(abs(p(3,0)−abs(p(2,0))<127),
(abs(p(3,1)−abs(p(2,1))<127),
(abs(p(2,2))<127),
(abs(p(2,3))<127),
(abs(p(3,2))<127),
(abs(p(2,3)−abs(p(2,2))<127),
(abs(p(3,3)−abs(p(3,2))<127),
(abs(p(3,2)−abs(p(2,2))<127), and
(abs(p(3,3)−abs(p(2,3))<127),
where abs(x) represents an absolute value of x, and p(a, b) represents a pixel value of the fourth block corresponding to a coordinate (a, b) of the matrix.

16. The method of claim 13, wherein quantizing the fourth block according to the refinement scale of the fourth block comprises:
utilizing a first bit allocation scheme for quantizing the fourth block when the refinement scale of the fourth block is higher than a predetermined scale; and
utilizing a second bit allocation scheme for quantizing the fourth block when the refinement scale of the fourth block is lower than the predetermined scale.

17. The method of claim 16, wherein the total number of bits of the first bit allocation scheme is the same as the total number of bits of the second bit allocation scheme, and the number of bits of the first bit allocation scheme corresponding to a low-frequency part of the fourth block is larger than the number of bits of the second bit allocation scheme corresponding to the low-frequency part of the fourth block.

18. The method of claim 16, wherein quantizing the fourth block according to the refinement scale of the fourth block further comprises adjusting the first bit allocation scheme and the second bit allocation scheme according to a compression ratio.

19. The method of claim 1, wherein encoding a quantized result of the fourth block comprises performing round-off operation, determining a prediction direction, and performing differential pulse code modulation for the quantized result of the fourth block.

20. A method of block decoding of an image comprising:
receiving bits of a first block;
determining a bit allocation of the first block and an encoding prediction direction;
decoding the first block into a second block having a plurality of wavelet coefficients corresponding to a first matrix according to the encoding prediction direction;
rearranging the plurality of wavelet coefficients of the second block for generating a third block according to an arrangement rule;
performing inverse wavelet transformation for generating a fourth block having a plurality of pixels corresponding to the first matrix;
rearranging the plurality of pixels of the fourth block for generating a fifth block according to the arrangement rule; and
outputting the fifth block.

21. The method of claim 20, wherein the first matrix is a 4×4 matrix.

22. The method of claim 20, wherein the arrangement rule is mapping a block to a second matrix and replacing a value of the block corresponding to a first coordinate of the second matrix with a value of the block corresponding to a second coordinate of the second matrix.

23. The method of claim 22, wherein the second matrix is a 4×4 matrix.

24. The method of claim 23, wherein the first coordinate is ((2i+m), (2j+n)) and the second coordinate is ((2m+i), (2n+j)), where m, n, i, j are 0 or 1.

25. The method of claim 20, wherein performing inverse wavelet transformation for the third block for generating the fourth block is partitioning the third block into a plurality of equal-size sub-blocks and performing inverse Haar wavelet transformation for the plurality of equal-size sub-blocks for generating the fourth block.

26. The method of claim 25, wherein each of the plurality of equal-size sub-blocks comprises pixels corresponding to a third matrix.

27. The method of claim 26, wherein the third matrix is a 2×2 matrix.

* * * * *